(12) United States Patent
Chen et al.

(10) Patent No.: US 7,486,033 B2
(45) Date of Patent: Feb. 3, 2009

(54) LIGHTING DEVICE

(75) Inventors: Sui-Tsung Chen, Hsinchu Hsien (TW); Li-Ling Lee, Hsinchu Hsien (TW); Hung-Chun Li, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 101 days.

(21) Appl. No.: 11/790,872

(22) Filed: Apr. 27, 2007

(65) Prior Publication Data

US 2008/0088241 A1    Apr. 17, 2008

(30) Foreign Application Priority Data

Oct. 14, 2006   (TW) ............................... 95137864 A

(51) Int. Cl.
*G05F 1/00* (2006.01)
(52) U.S. Cl. ..................... 315/294; 315/312; 315/224; 315/247; 315/86; 307/66; 307/64
(58) Field of Classification Search .................. 315/86, 315/312, 318, 294, 297, 224, 247, 307; 307/43, 307/48, 64, 66
See application file for complete search history.

(56) References Cited

U.S. PATENT DOCUMENTS 6,933,627 B2 * 8/2005 Wilhelm ...................... 307/66
7,009,348 B2 * 3/2006 Mogilner et al. ............. 315/307
7,178,941 B2 * 2/2007 Roberge et al. .............. 362/225

* cited by examiner

*Primary Examiner*—Haissa Philogene
(74) *Attorney, Agent, or Firm*—Birch, Stewart, Kolasch & Birch, LLP

(57) ABSTRACT

A lighting device including: a power management module connected with and processing alternating-current power and outputting direct-current power; a light source driving module receiving and processing a portion of the direct-current power and outputting a light source driving signal; a first lighting unit receiving the light source driving signal and illuminating a light source; a sensing unit sensing the light source driving signal intensity; a lighting module receiving a portion of the direct-current power output by the power management module, processing the received direct-current power, outputting a direct-current power signal, storing the direct-current power signal through a power storage control function, processing the stored direct-current power signal by means of a power storage control unit whenever the sensing unit senses that the light source driving module does not output the light source driving signal, and outputting a lighting light source driving signal to a second lighting unit for illuminating a light source.

20 Claims, 1 Drawing Sheet

LIGHTING DEVICE

BACKGROUND OF THE INVENTION

1. Field of the Invention

The present invention relates to lighting devices, and more particularly, to a lighting device having various lighting functions.

2. Description of the Prior Art

The current existing lighting devices are, namely incandescent lamps, fluorescent lamps (tube or compact), halogen lamps, metal halide lamps, and LED lamps (in the order of introduction). Among these lighting devices, LED lamps have advantages, such as compactness, high brightness, high energy efficiency and diversified colors. For these reasons, LED lamps are in wide use.

There are numerous ways of combining lamps (including electronic stabilizers and lamp bases). This is particularly true in adjustable decorative lamps. Their fashionable appearances are not only based on elegant design but also because they are user-friendly—users control light intensity and light color of the lamps to meet user needs (depending on, for example, the particular scenario of usage, desired atmosphere, and time). In addition to our daily lighting, emergency lighting is also important. Emergency lamps are usually installed in stairways and on emergency doors to indicate the correct path to safety. Normally, emergency lamps may be operated with stand-by power from batteries in case of power failure. Therefore, it is appreciated that lighting device plays an important role in our daily life.

In case of interruption of power supply (because of, for example, a blackout, fire, earthquake, typhoon, and equipment failure), the aforesaid lighting inevitably goes dark. Furthermore, high costs are incurred, when stairways and emergency exits—places where emergency lights are installed—are equipped with routine lighting as well.

Accordingly, an issue calling for urgent solution involves developing a lighting device to overcome the aforesaid drawbacks of the prior art.

SUMMARY OF THE INVENTION

In light of the aforesaid drawbacks of the prior art, it is a primary objective of the present invention to disclose a lighting device having various lighting functions.

Another objective of the present invention is to provide a lighting device for preventing inconvenience that may otherwise arise when routine lighting ceases to operate following interruption of alternating-current power supply.

Yet another objective of the present invention is to provide a cost-saving lighting device.

A further objective of the present invention is to provide a lighting device having adjustable brightness function.

In order to achieve the above and other objectives, the present invention discloses a lighting device, comprising: a power management module configured to connect with alternating-current power, to process the alternating-current power, and to output direct-current power; a light source driving module electrically coupled to the power management module and configured to receive direct-current power output by the power management module, to process the received direct-current power, and to output a light source driving signal; a first lighting unit electrically coupled to the light source driving module and configured to receive the light source driving signal output by the light source driving module and illuminate a light source; a sensing unit electrically coupled to the light source driving module and configured to sense the light source driving signal output by the light source driving module; a lighting module electrically coupled to the power management module and the sensing unit, characterized by a power storage control function, and configured to receive direct-current power output by the power management module, to process the received direct-current power, to output a direct-current power signal, to store the direct-current power signal by means of the power storage control function, to process the stored direct-current power signal by means of a power storage control unit whenever the sensing unit senses that the light source driving module does not output the light source driving signal, and to output a lighting light source driving signal; and a second lighting unit electrically coupled to the lighting module and configured to receive the lighting light source driving signal output by the lighting module and illuminate a light source.

In order to achieve the objective of providing an adjustable brightness, the lighting device of the present invention further comprises a brightness control module electrically coupled to the light source driving module and the sensing unit and configured to receive the light source driving signal sensed by the sensing unit, compare the received light source driving signal with a set value, and output a brightness signal to the light source driving module, so as to allow the light source driving module to adjust light source brightness of the first lighting unit in accordance with the brightness signal.

Unlike the prior art, the present invention discloses a lighting device comprising a power management module, a light source driving module, a sensing unit, and a lighting module for driving a first lighting unit and a second lighting unit in accordance with different electrical coupling relationships under different situations so as to achieve the above and other objectives, and the present invention further discloses a brightness control module to achieve adjustable brightness.

DETAILED DESCRIPTION OF THE EMBODIMENT

Figure 1:
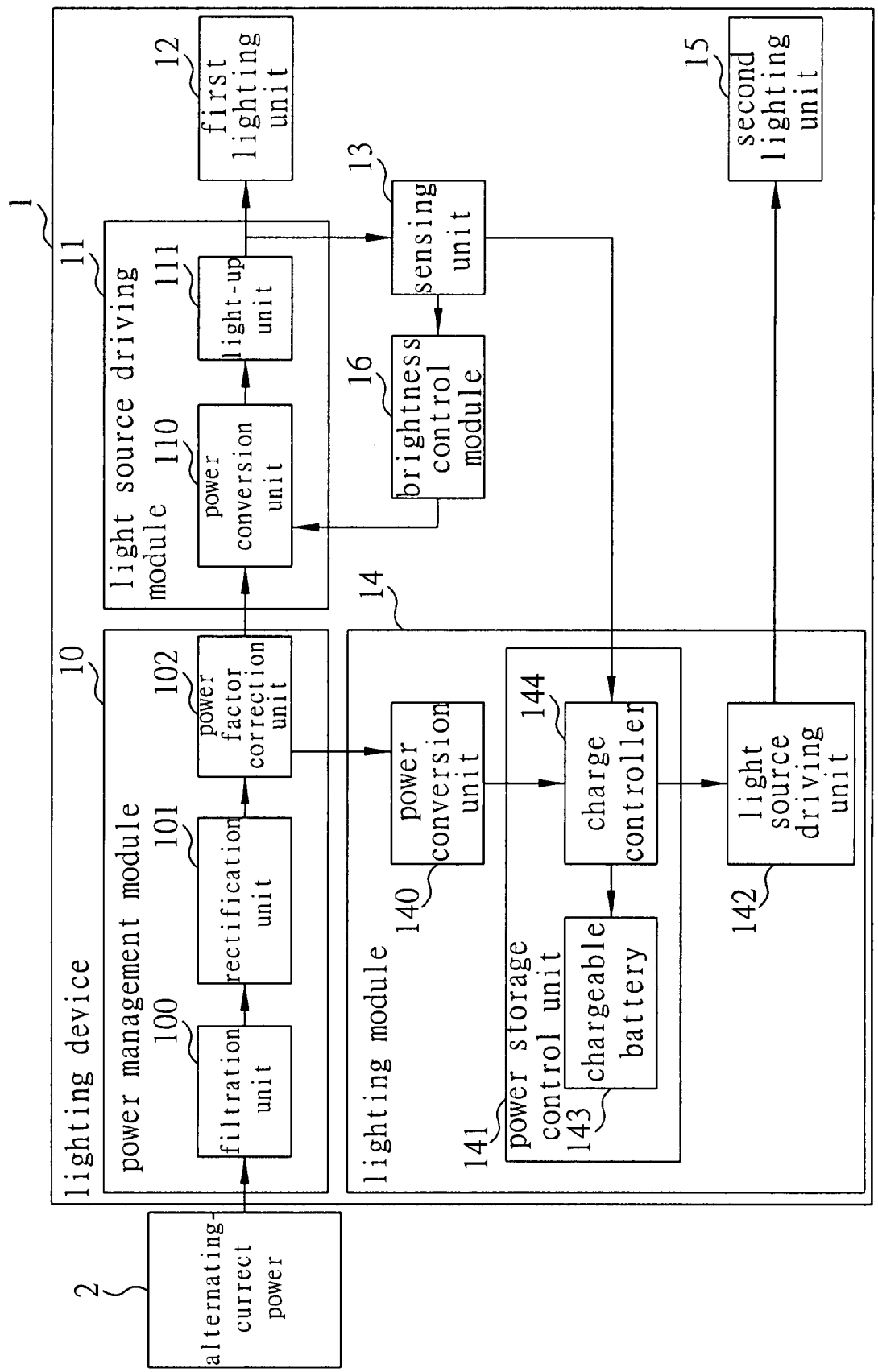
FIG. 1 shows the structure of one embodiment of the lighting device of the present invention.

The following specific embodiment is provided to illustrate the present invention. Persons skilled in the art can readily gain an insight into other advantages and features of the present invention based on the contents disclosed in this specification.

With reference to FIG. 1, the structure of one embodiment of a lighting device of the present invention is shown. The lighting device 1 of the present invention comprises a power management module 10, a light source driving module 11, a first lighting unit 12, a sensing unit 13, a lighting module 14, a second lighting unit 15, and a brightness control module 16.

The aforesaid components of this embodiment of the lighting device 1 of the present invention are described as follows.

The power management module 10 is configured to connect with alternating-current power 2, process the alternating-current power 2, and output direct-current power. In this embodiment, the power management module 10 further comprises a filter unit 100, a rectification unit 101, and a power factor correction unit 102. The filter unit 100 is configured to connect with the alternating-current power 2 to filter the alternating-current power 2 and output filtered power. The rectification unit 101 is electrically coupled to the filter unit 100 and configured to receive the filtered alternating current power, rectify the filtered alternating current power, and output corresponding direct-current power rectified from the received alternating current power. The power factor correction unit 102 is electrically coupled to the rectification unit 101 and configured to receive the direct-current signal output by the rectification unit 101, perform power factor correction on the received direct-current signal, and output direct-current power. The filter unit 100 can be one or more inductors and capacitors. The rectification unit 101 can be a bridge rectifier. The power factor correction unit 102 can be a power factor correction (PFC) converter.

Note that the electrical coupling relationship between the filtration unit 100 and the rectification unit 101 is not limited to this embodiment (as shown in the drawing); instead, it is feasible to have rectification performed by the rectification unit 101 and then filtered by the filter unit 100; alternatively, it is feasible to have rectification and filter concurrently performed by the rectification unit 101 and the filter unit 100 respectively. The power management module 10 may, when necessary, comprise any other functional processing units, such as a voltage-stabilizing unit configured for voltage stabilization so as to provide a relatively stable voltage for subsequent processing. The art involving filter, rectification, power factor correction, and voltage stabilization performed by the filter unit 100, rectification unit 101, power factor correction unit 102, and, optionally, a voltage stabilizing unit, respectively, is well-known to persons of ordinary skill in the art and therefore not described herein for the sake of brevity.

The light source driving module 11 is electrically coupled to the power management module 10 and configured to receive direct-current power output by the power management module 10, process the received direct-current power, and output a light source driving signal. In this embodiment, the light source driving module 11 further comprises a power conversion unit 110 and a light-up unit 111. The power conversion unit 110 is electrically coupled to the power management module 10 and configured to receive the direct-current power output by the power management module 10, perform power conversion on the received direct-current power, and output a high-frequency alternating current driving power signal. The light-up unit 111 is electrically coupled to the power conversion unit 110 and configured to receive the high-frequency alternating current power signal output by the power conversion unit 110, perform a light source driving process on the received high-frequency alternating current power signal, and output the light source driving signal. The light source driving process performed by the power conversion unit 110 comprises converting direct current to high-frequency alternating current (DC to AC), so as to convert the received direct-current power to a high-frequency alternating-current driven power signal meeting the requirements of the light-up unit 111. The light-up unit 111 can be a light-up circuit. In practice, the light-up circuit is formed with inductors and capacitors connected in series or in parallel.

The art involving the power conversion and the light source driving process performed by the power conversion unit 110 and the light-up unit 111 respectively is well-known to persons of ordinary skill in the art and therefore is not described in detail herein for the sake of brevity.

The first lighting unit 12 is electrically coupled to the light source driving module 11 and configured to receive the light source driving signal output by the light source driving module 11 and output a light source. In this embodiment, the first lighting unit 12 can be an incandescent lamp, fluorescent lamp, halogen lamp, LED lamp, or HID lamp (high intensity discharge lamp, such as a metal halide lamp, xenon lamp, and projector lamp), and the quantity thereof is determined as appropriate. In this embodiment, an LED lamp functioning as the first lighting unit 12 is environmentally friendly and conducive to so-called green-lighting.

A point to note is that the light-up unit 111 of the light source driving module 11 may comprise any other functional processing elements (depending on the type of the first lighting unit 12 electrically coupled to the light-up unit 111). For example, if the first lighting unit 12 is implemented as a xenon lamp, the light-up unit 111 of the light source driving module 11 will further comprise a high-voltage igniter.

The sensing unit 13 is electrically coupled to the light source driving module 11 and configured to sense the light source driving signal output by the light source driving module 11. In this embodiment, the sensing unit 13 is a current sensor, such as a current transformer and a Hall component (Hall effect sensor), so as to sense the light source driving signal intensity in order to provide electrical feedback to another electrically coupled end.

The lighting module 14 is electrically coupled to the power management module 10 and the sensing unit 13, characterized by a power storage control function, and configured to receive the direct-current power output by the power management module 10, process the received direct-current power, output a direct-current power signal, store the direct-current power signal by means of the power storage control function, process the stored direct-current power signal whenever the sensing unit 13 senses that the light source driving module 11 does not output the light source driving signal, and output a lighting light source driving signal.

In this embodiment, the lighting module 14 further comprises a power conversion unit 140, a power storage control unit 141, and a light source driving unit 142. The power conversion unit 140 is electrically coupled to the power management module 10 and configured to receive the direct-current power output by the power management module 10, perform power conversion on the received direct-current power, and output the direct-current power signal. The power storage control unit 141 is electrically coupled to the power conversion unit 140 and the sensing unit 13 and configured to receive and store the direct-current power signal output by the power conversion unit 140 and output the stored direct-current power signal whenever the sensing unit 13 senses that the light source driving module 11 does not output the light source driving signal. The light source driving unit 142 is electrically coupled to the power storage control unit 141 and configured to receive the direct-current power signal output by the power storage control unit 141, perform a light source driving process on the received direct-current power signal, and output the lighting light source driving signal. The power conversion unit 140 can be a DC-DC step-down converter. The light source driving unit 142 can be a driving circuit. The art related to the power conversion and the light source driving process performed by the power conversion unit 140 and the light source driving unit 142 respectively is well-known to persons of ordinary skill in the art and therefore is not described in detail herein for the sake of brevity.

The power storage control unit 141 further comprises a chargeable battery 143 and a charge controller 144. The chargeable battery 143 stores the direct-current power signal output by the power conversion unit. The charge controller 144 is electrically coupled to the power conversion unit 140, the sensing unit 13, and the chargeable battery 143, wherein the charge controller 144 is configured to receive the direct-current power signal output by the power conversion unit 140, perform a charging procedure on the chargeable battery 143, stop the charging procedure as soon as the chargeable battery 143 is full, and output the direct-current power signal stored in the chargeable battery 143 whenever the sensing unit 13 senses that the light source driving module 11 does not output the light source driving signal. Note that recitation that the light source driving module 11 does not output the light source driving signal means that the outputting of the light source driving signal by the light source driving module 11 is suddenly interrupted. The art related to the charging procedure performed on the chargeable battery 143 by the charge controller 144 is well-known to persons of ordinary skill in the art and therefore is not described in detail herein for the sake of brevity.

The second lighting unit 15 is electrically coupled to the lighting module 14 and configured to receive the lighting light source driving signal output by the lighting module 14 and output a light source. In this embodiment, the second lighting unit 15 is an incandescent lamp, fluorescent lamp, halogen lamp, LED lamp, or HID lamp (high intensity discharge lamp, such as a metal halide lamp, xenon lamp, and projector lamp), and the quantity thereof is determined as appropriate. In this embodiment, an LED lamp functioning as the second lighting unit 15 is utilized for prolonged lighting under battery power.

Note that the light source driving unit 142 of the lighting module 14 may comprise any other functional processing elements (depending on the type of the second lighting unit 15 electrically coupled to the light source driving unit 142). For example, if the second lighting unit 15 is implemented as a xenon lamp, the light source driving unit 142 of the lighting module 14 will further comprise a high-voltage igniter.

The brightness control module 16 is electrically coupled to the light source driving module 11 and the sensing unit 13 and configured to receive the light source driving signal sensed by the sensing unit 13, compare the received light source driving signal with a set value, and output a brightness signal to the light source driving module 11, so as to allow the light source driving module 11 to adjust light source brightness of the first lighting unit 12 in accordance with the brightness signal. In this embodiment, the set value is a default value or is set in a human-based manner, and the comparison process is performed by a logic comparator. In the situation where the set value is set in a human-based manner, the brightness control module 16 is further provided with a setting unit, such as a knob, to allow users to adjust the light source brightness of the first lighting unit 12 to meet user needs. The art related to the comparison process performed by a logic comparator of the brightness control module 16 and the setting unit provided for the brightness control module 16 is well-known to persons of ordinary skill in the art and therefore is not described in detail herein for the sake of brevity.

Note that the first lighting unit 12 and second lighting unit 15 of the lighting device 1 of the present invention can be implemented using existing lamps. For example, in the situation where there are four existing lamps, two of the existing lamps could be implemented as the first lighting unit 12 for providing routine lighting, whereas the other two existing lamps could be implemented as the second lighting unit 15 for providing another lighting function (such as emergency lighting), and the existing lamps can comprise an additional second lighting unit 15 for providing yet another lighting function.

In this embodiment, the lighting device 1 of the present invention may further comprises a switch for starting the routine lighting function and the other lighting function as soon as the switch is turned on; in other words, the second lighting function is at a fully-charged state while execution of the routine lighting function is underway, and thus a pause on the part of the routine lighting function (upon interruption of power supply arising from a blackout, fire, earthquake, typhoon, or equipment failure,) triggers the execution of the other lighting function for the sake of emergency lighting. In this embodiment, the lighting device 1 of the present invention may further comprise two switches for controlling the starting of the routine lighting function and the second lighting function, respectively, such that the routine lighting function and the second lighting function are started separately.

The art related to the switches is well-known to persons of ordinary skill in the art and therefore is not described in detail herein for the sake of brevity.

In short, a lighting device of the present invention comprises a power management module, a light source driving module, a sensing unit, and a lighting module electrically coupled to one another so as to drive the first lighting unit and second lighting unit in various situations. The power management module is configured to connect with alternating-current power, process the alternating-current power, and output direct-current power. The light source driving module receives the direct-current power output by the power management module, processes the received direct-current power, and outputs a light source driving signal to a first lighting unit. The first lighting unit receives the light source driving signal and outputs a light source. The sensing unit senses the light source driving signal intensity. The lighting module receives the direct-current power output by the power management module and a signal output by the sensing unit indicating the status of the light source driving module, processes the received direct-current power, outputs a direct-current power signal, stores the direct-current power signal by means of a power storage control function, processes the stored direct-current power signal whenever the sensing unit senses that the light source driving module does not output the light source driving signal, and outputs a lighting light source driving signal to a second lighting unit for illuminating a light source.

Accordingly, the lighting device of the present invention provides a routine lighting function by means of the first lighting unit and provides another lighting function (e.g., an emergency lighting function) by means of the second lighting unit whenever the routine lighting function becomes ineffective due to interruption of alternating-current power supply. Therefore, not only the lighting device of the present invention is convenient for users, but the lighting device of the present invention is cost-effective because of the combination of the routine lighting function and the second lighting function. In addition, the brightness adjustment function of the lighting device of the present invention is enhanced by a brightness control module of the lighting device of the present invention.

The aforesaid embodiment merely serves as the preferred embodiment of the present invention. The aforesaid embodiment should not be construed as to limit the scope of the present invention in any way. Hence, many other changes can be made in the present invention in practice. It will be apparent to those skilled in the art that all equivalent modifications or changes made to the present invention, without departing from the spirit and the technical concepts disclosed by the present invention, should fall within the scope of the appended claims.

What is claimed is:

1. A lighting device, comprising:
a power management module configured to connect with alternating-current power, process the alternating-current power, and output direct-current power;
a light source driving module electrically coupled to the power management module and configured to receive the direct-current power output by the power management module, process the received direct-current power, and output a light source driving signal;

a first lighting unit electrically coupled to the light source driving module and configured to receive the light source driving signal output by the light source driving module and output a light source;

a sensing unit electrically coupled to the light source driving module and configured to sense the light source driving signal output by the light source driving module;

a lighting module electrically coupled to the power management module and the sensing unit, characterized by a power storage control function, and configured to receive the direct-current power output by the power management module, process the received direct-current power, output a direct-current power signal, store the direct-current power signal by means of the power storage control function, process the stored direct-current power signal whenever the sensing unit senses that the light source driving module does not output the light source driving signal, and output a lighting light source driving signal; and a second lighting unit electrically coupled to the lighting module and configured to receive the lighting light source driving signal output by the lighting module and output a light source.

2. The lighting device of claim 1, wherein the power management module further comprises:
  a filter unit configured to connect with the alternating-current power, filter the alternating-current power, and output a filtered signal;
  a rectification unit electrically coupled to the filter unit and configured to receive the filtered signal output by the filter unit module, rectify the received filtered signal, and output a direct-current signal; and
  a power factor correction unit electrically coupled to the rectification unit and configured to receive the direct-current signal output by the rectification unit, perform power factor correction on the received direct-current signal, and output the direct-current power.

3. The lighting device of claim 2, wherein the filter unit is one or more inductors and capacitors.

4. The lighting device of claim 2, wherein the rectification unit is a bridge rectifier.

5. The lighting device of claim 2, wherein the power factor correction unit is a power factor correction (PFC) converter.

6. The lighting device of claim 1, wherein the light source driving module further comprises:
  a power conversion unit electrically coupled to the power management module and configured to receive the direct-current power output by the power management module, perform power conversion on the received direct-current power, and output a high-frequency alternating-current driving power signal; and
  a light-up unit electrically coupled to the power conversion unit and configured to receive the high-frequency alternating-current driving power signal output by the power conversion unit, perform light source driving on the received high-frequency alternating-current driving power signal, and output the light source driving signal.

7. The lighting device of claim 6, wherein the light-up unit is a light-up circuit.

8. The lighting device of claim 1, wherein the first lighting unit is one selected from the group consisting of an incandescent lamp, fluorescent lamp, halogen lamp, metal halide lamp, and an LED lamp.

9. The lighting device of claim 1, wherein the sensing unit is a current sensor.

10. The lighting device of claim 1, wherein the lighting module further comprises:
  a power conversion unit electrically coupled to the power management module and configured to receive the direct-current power output by the power management module, perform power conversion on the received direct-current power, and output the direct-current power signal;
  a power storage control unit electrically coupled to the power conversion unit and the sensing unit and configured to receive and store the direct-current power output by the power conversion unit and output stored direct-current power whenever the sensing unit senses that the light source driving module does not output the light source driving signal; and
  a light source driving unit electrically coupled to the power storage control unit and configured to receive the direct-current power output by the power storage control unit, perform light source driving on the received direct-current power signal, and output the lighting light source driving signal.

11. The lighting device of claim 10, wherein the power conversion unit is a DC-DC step-down converter.

12. The lighting device of claim 10, wherein the power storage control unit further comprises:
  a chargeable battery for storing the direct-current power output by the power conversion unit; and
  a charge controller electrically coupled to the power conversion unit, the sensing unit, and the chargeable battery and configured to receive the direct-current power output by the power conversion unit, perform a charging procedure on the chargeable battery, stop the charging procedure as soon as the chargeable battery is full, and output direct-current power stored in the chargeable battery whenever the sensing unit senses that the light source driving module does not output the light source driving signal.

13. The lighting device of claim 10, wherein the light source driving unit is a driving circuit.

14. The lighting device of claim 1, wherein the second lighting unit is one selected from the group consisting of an incandescent lamp, fluorescent lamp, halogen lamp, metal halide lamp, and an LED lamp.

15. The lighting device of claim 1, further comprising:
  a brightness control module electrically coupled to the light source driving module and the sensing unit and configured to receive the light source driving signal sensed by the sensing unit, compare the received light source driving signal with a set value, and output a brightness signal to the light source driving module, so as to allow the light source driving module to adjust the light source brightness of the first lighting unit in accordance with the brightness signal.

16. The lighting device of claim 6, further comprising:
  a brightness control module electrically coupled to the light source driving module and the sensing unit and configured to receive the light source driving signal sensed by the sensing unit, compare the received light source driving signal with a set value, and output a brightness signal to the light source driving module, so as to allow the light source driving module to adjust the light source brightness of the first lighting unit in accordance with the brightness signal.

17. The lighting device of claim 10, further comprising:
  a brightness control module electrically coupled to the light source driving module and the sensing unit and configured to receive the light source driving signal sensed by the sensing unit, compare the received light source driving signal with a set value, and output a brightness signal to the light source driving module, so as to allow the light source driving module to adjust the light source brightness of the first lighting unit in accordance with the brightness signal.

18. The lighting device of claim 12, further comprising:
a brightness control module electrically coupled to the light source driving module and the sensing unit and configured to receive the light source driving signal sensed by the sensing unit, compare the received light source driving signal with a set value, and output a brightness signal to the light source driving module, so as to allow the light source driving module to adjust the light source brightness of the first lighting unit in accordance with the brightness signal.

19. The lighting device of claim 15, wherein the set value is a default value.

20. The lighting device of claim 15, wherein the comparison process is performed by a logic comparator.

* * * * *